United States Patent [19]

Wiese

[11] 4,426,092

[45] Jan. 17, 1984

[54] MECHANICAL SEAL ASSEMBLY

[75] Inventor: Winfred J. Wiese, Whittier, Calif.

[73] Assignee: Borg-Warner Corporation, Chicago, Ill.

[21] Appl. No.: 393,580

[22] Filed: Jun. 30, 1982

Related U.S. Application Data

[63] Continuation-in-part of Ser. No. 314,302, Oct. 23, 1981, abandoned.

[51] Int. Cl.³ .............................................. F16J 15/34
[52] U.S. Cl. ........................................ 277/96.1; 277/87
[58] Field of Search ................. 277/96.1, 93 R, 81 R, 277/87

[56] References Cited

U.S. PATENT DOCUMENTS

| | | | |
|---|---|---|---|
| 3,638,957 | 2/1972 | Marsi | 277/96.1 |
| 3,957,276 | 5/1976 | Wiese | 277/96.1 |
| 4,103,907 | 8/1978 | Inouye | 277/96.1 |
| 4,212,475 | 7/1980 | Sedy | 277/96.1 |

Primary Examiner—Robert I. Smith
Attorney, Agent, or Firm—Aubrey L. Burgess

[57] ABSTRACT

A mechanical seal assembly having a rotatable sealing ring means mounted for rotation on a shaft and a stationary sealing ring means connected to a housing flange, the sealing ring means having opposed sealing surfaces. The assembly also has means urging the sealing surfaces toward one another. The rotatable sealing ring means is of stepped configuration and constructed as an integral pair of equal axial length ring portions, one portion having its inner and outer diameters larger than the respective diameters of the other. Generally, the ring portion having the smallest inner and outer diameter is that ring portion having the sealing surface—one that opposes the sealing surface of the stationary sealing ring means.

The degree of deflection of the sealing surface because of hydraulic load or pressure can be selected by selecting the diameters of the pair of ring portions, i.e., if the ring portions have substantially the same shrinkage, the sealing surface will remain substantially flat; if the shrinkage of the ring portion with the largest inner and outer diameters is more than the other ring portion, the seal surface will become convex; if the opposite relationship of the cross-sections is selected, the seal surface will become concave.

2 Claims, 2 Drawing Figures

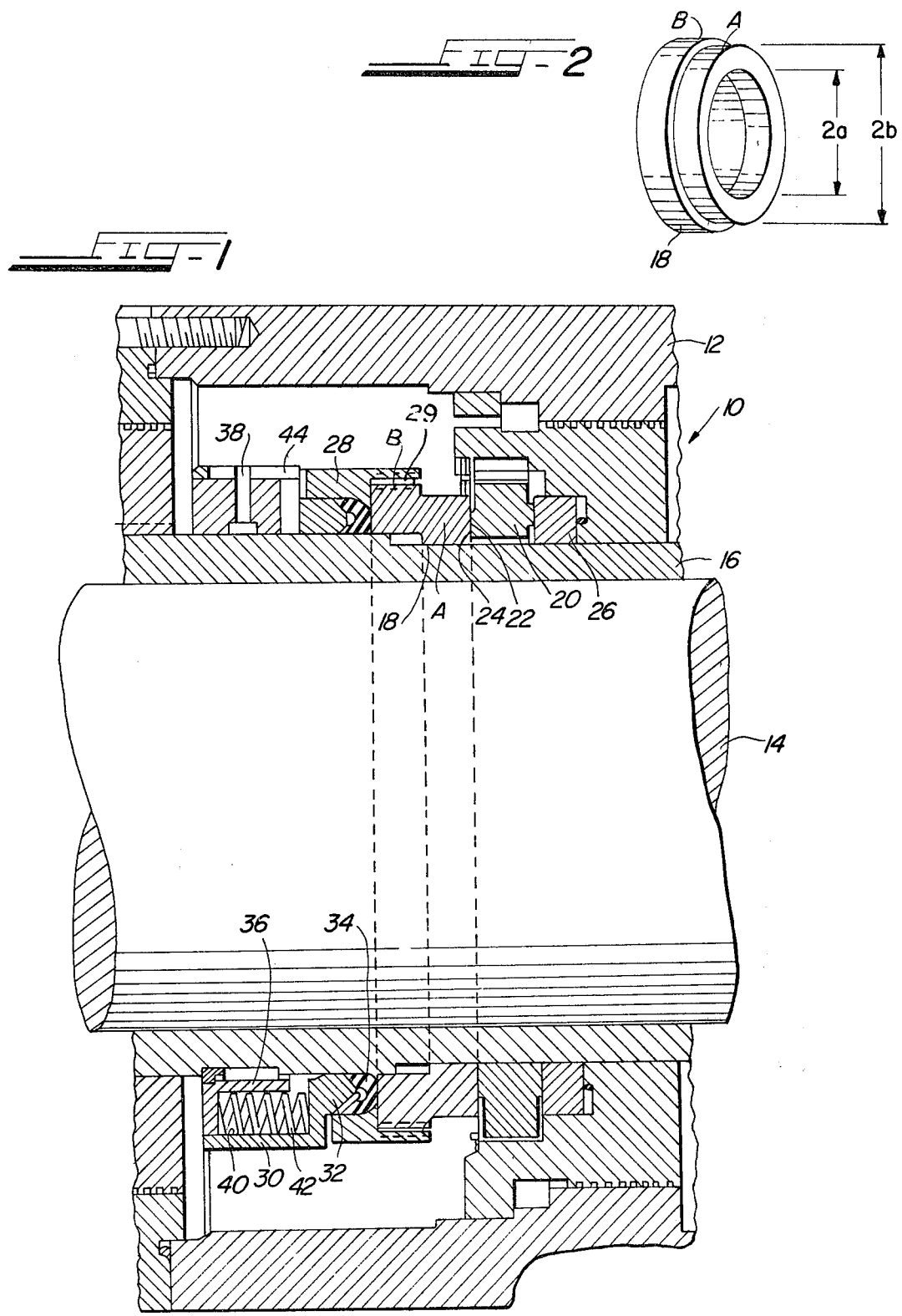

MECHANICAL SEAL ASSEMBLY

CROSS REFERENCE TO RELATED APPLICATION

This application is a continuation-in-part application of my copending application, Ser. No. 314,302, filed Oct. 23, 1981 and entitled "Improved Mechanical Seal Assembly" and now abandoned.

BACKGROUND OF THE INVENTION

Mechanical seal assemblies for sealing a rotary shaft to a housing having a shaft opening through which the shaft extends are well known in the art. Excessive leakage and erratic performance of some of the seal assemblies have been experienced, especially when such assemblies encounter high pressures, and especially variable high pressures.

SUMMARY OF THE INVENTION

According to the invention herein described, a mechanical seal assembly for sealing a rotary shaft to a housing having a shaft opening through which the shaft extends comprises a rotatable sealing ring means connected to the shaft for rotation therewith and for limited axial movement relative to the shaft, and a stationary sealing ring means connected to the housing. The rotatable and stationary sealing ring means have opposed, generally radial and lapped sealing surfaces, and means are provided to urge the sealing ring means toward one another. The rotatable sealing ring means is of generally stepped configuration and is constructed of a pair of integral ring portions, each having the same axial length or dimension. One ring portion has an inner and outer diameter greater than the respective diameters of the other ring portion. The ratio of inner and outer diameters of the pair of ring portions is selected to provide a desired degree of deflection of the sealing surface of the rotatable sealing ring means. When the ring portions have substantially the same shrinkage the sealing surface will remain flat; when the shrinkage of the ring portion with the larger inner and outer diameter is more than the other ring portion, the seal surface will become convex; when the opposite relationship is selected, the seal surface will become concave.

BRIEF DESCRIPTION OF THE DRAWING

FIG. 1 of the drawing illustrates in section a mechanical seal assembly constructed according to this invention; and FIG. 2 is a perspective of a rotatable sealing ring means usable in the FIG. 1 seal assembly.

DETAILED DESCRIPTION OF THE PREFERRED EMBODIMENT

FIG. 1 of the drawing illustrates a mechanical seal assembly 10 which includes a multiple part housing 12 with a shaft 14 extending therethrough. A shaft sleeve 16 closely surrounds the shaft 14 and is keyed or otherwise fastened (not shown) to the shaft for rotation with the shaft. The seal assembly 10 further comprises a rotating sealing ring means 18 and a stationary sealing ring means 20, the seal ring means 18 and 20 having lapped seal faces 22 and 24, respectively, opposed to one another. The seal ring means 20 is keyed to the housing 12 and is backed by a back-up ring 26 sealed to the housing 12.

The rotatable sealing ring means 18 is keyed to a sealing ring holder 28 by a key 29, which is in turn keyed to a U-cup follower 30 having a nose 32 engaging a U-cup 34 fitting within the holder 28 and abutting the rear of the sealing ring means 18. The U-cup follower 30 is drivingly connected to an annular spring holder 36 by a drive pin 38, the spring holder 36 having a plurality of longitudinally extending spring pockets 40, each receiving a spring 42 urging the U-cup follower toward the U-cup 34 and the sealing ring means 18 toward the other sealing ring means 20. As illustrated, drive pin 38 fits into a slot 44 in U-cup follower 30, permitting longitudinal movement of the latter while insuring rotation thereof with the shaft and shaft sleeve. The arrangement of parts as described is generally conventional and shown in my earlier U.S. Pat. No. 3,628,799, granted Dec. 21, 1971. Conventionally, O-ring seals are used where necessary and/or desirable.

The rotary seal ring means 18 according to this invention and unlike my earlier patent is of stepped configuration and comprises what, while of unitary construction, may be described as being constructed of two simple ring sections, identified as A and B. The sections A and B are illustrated in the drawings as being separated by a broken line for purposes of discussion. The sections A and B have the same axial length or dimension, ie, the lengths measured in the direction of the shaft 14.

By making the longitudinal cross-sections of the ring sections A and B so that both shrink the same amount under hydraulic load or pressure, the flatness of the end face 22 will remain unchanged.

If, however, it is desirable to have the end face 22 become concave under pressure, the cross-section of A must be sized so that it shrinks more than the cross-section B. Conversely, if the end face 22 is to become convex under pressure, the cross-section B must shrink more than the cross-section A.

The shrinkage of A or B, i.e., each ring portion can be calculated by using an equation for determining compressive hoop stress in cylinders, namely:

$$U = \frac{bp}{E}\left(\frac{a^2 + b^2}{b^2 - a^2} - v\right)$$

where
 U = shrinkage
 a = inside radius
 b = outside radius
 p = pressure
 E = modulus of elasticity; and
 v = Poisson's ratio FIG. 2 illustrates the sealing ring means 18 with the radii of one portion noted thereon.

As an example for a rotatable sealing ring made of titanium carbide which has a modulus of elasticity of $5.9 \times 10^7$ and Poisson's ratio of 0.236, subjected to a working pressure of 625 psi, the shrinkage of ring portions A and B for given inner and outer diameters will be as in the following chart:

| | Ring Portion | O.D. (2b) (inches) | I.D. (2a) (inches) | Shrinkage ($\times 10^{-4}$) inch |
|---|---|---|---|---|
| Case 1 | A | 8.625 | 7.385 | 2.859 |
| | B | 8.163 | 7.038 | 2.835 |
| Case | A | 8.500 | 7.385 | 3.116 |

-continued

| | Ring Portion | O.D. (2b) (inches) | I.D. (2a) (inches) | Shrinkage ($\times 10^{-4}$)inch |
|---|---|---|---|---|
| 2 | B | 8.125 | 7.038 | 2.915 |
| Case | A | 8.750 | 7.385 | 2.649 |
| 3 | B | 8.125 | 7.038 | 2.915 |

With the inner and outer diameter dimensions shown in Case 1, the amount of shrinkage is substantially the same; therefore the face 22 will remain substantially flat. In Case 2, ring portion A shrinks more than ring portion B; therefore, the face 22 will become concave. In Case 3, ring portion B shrinks more than ring portions A; therefore the face 22 will become convex.

Thus, the ratio of inner and outer diameters of the pair of ring portions can be selected to provide the desired degree of deflection of the seal surface of the rotatable sealing ring means.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A mechanical seal assembly for sealing a rotary shaft to a housing having a shaft opening through which the shaft extends, comprising:
   a rotatable seal ring encircling and connected to said shaft for rotation therewith and for limited axial movement relative to said shaft;
   a stationary seal ring encircling said shaft and connected to said housing;
   said rotatable and stationary seal rings having opposed and generally radial sealing surfaces; and
   means for urging one seal ring toward another;
   said rotatable seal ring being of stepped configuration and consisting of two unitary ring portions, each ring portion having the same axial dimension, one ring portion having inner and outer diameters greater than the inner and outer diameters of the other ring portion;
   the diameters of the ring portions being selected to provide a desired degree of deflection of the sealing surface of said rotatable seal ring.

2. A mechanical seal assembly as recited in claim 1, in which the shrinkage of each ring portion is determined by the equation:

$$U = \frac{bp}{E}\left(\frac{a^2 + b^2}{b^2 - a^2} - v\right)$$

where
U = shrinkage
a = inside radius
b = outside radius
p = pressure
E = modulus of elasticity, and
v = Poisson's ratio.

* * * * *